United States Patent
Guthrie et al.

(10) Patent No.: US 7,279,424 B2
(45) Date of Patent: Oct. 9, 2007

(54) METHOD FOR FABRICATING THIN FILM MAGNETIC HEADS USING CMP WITH POLISHING STOP LAYER

(75) Inventors: Hung-Chin Guthrie, Saratoga, CA (US); Ming Jiang, San Jose, CA (US); Hong Zhang, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 165 days.

(21) Appl. No.: 10/928,002

(22) Filed: Aug. 27, 2004

(65) Prior Publication Data

US 2006/0043060 A1    Mar. 2, 2006

(51) Int. Cl.
*H01L 21/302* (2006.01)

(52) U.S. Cl. .......................... 438/692; 216/22; 216/88; 216/83; 216/37; 216/89; 216/99; 216/102

(58) Field of Classification Search ................ 438/692
See application file for complete search history.

(56) References Cited

U.S. PATENT DOCUMENTS

| | | | |
|---|---|---|---|
| 6,083,840 A | 7/2000 | Mravic et al. | |
| 6,217,416 B1* | 4/2001 | Kaufman et al. | 451/41 |
| 6,258,137 B1 | 7/2001 | Garg et al. | |
| 6,348,076 B1 | 2/2002 | Canaperi et al. | |
| 6,375,693 B1 | 4/2002 | Cote et al. | |
| 6,447,371 B2 | 9/2002 | Brusic Kaufman et al. | |
| 6,468,913 B1 | 10/2002 | Pasqualoni et al. | |
| 6,554,878 B1 | 4/2003 | Dill et al. | |
| 6,620,721 B1* | 9/2003 | Lee | 438/612 |
| 6,669,983 B2 | 12/2003 | Kagami et al. | |
| 2001/0037821 A1 | 11/2001 | Staley et al. | |
| 2001/0049183 A1 | 12/2001 | Henson et al. | |
| 2002/0012195 A1 | 1/2002 | Lahiri et al. | |
| 2002/0065023 A1 | 5/2002 | Kwok | |
| 2002/0093763 A1* | 7/2002 | Sato et al. | 360/126 |
| 2003/0133225 A1* | 7/2003 | Hsiao et al. | 360/126 |
| 2003/0179497 A1 | 9/2003 | Harris et al. | |
| 2003/0188422 A1* | 10/2003 | Hashimoto et al. | 29/603.14 |
| 2004/0061229 A1* | 4/2004 | Moslehi | 257/758 |
| 2004/0145826 A1* | 7/2004 | Sasaki et al. | 360/126 |
| 2004/0183204 A1* | 9/2004 | Cave et al. | 257/774 |
| 2005/0107870 A1* | 5/2005 | Wang et al. | 623/1.44 |

FOREIGN PATENT DOCUMENTS

JP    2000012543 A1    1/2000

* cited by examiner

*Primary Examiner*—Nadine Norton
*Assistant Examiner*—Patricia A. George
(74) *Attorney, Agent, or Firm*—G. Marlin Knight

(57) ABSTRACT

A method is described for thin film processing using a selected CMP slurry with a silicon dioxide stop layer. The slurry includes an abrasive, preferably alumina, a corrosion inhibitor, preferably benzotriazole (BTA), and an oxidizer preferably hydrogen peroxide. The method is particularly useful for fabricating thin film heads where alumina is used as the dielectric. The method can be used to planarize metal structures surrounded by alumina in magnetic heads. The alumina refill is deposited to the final target height which is slightly below the height of the metal. A thin silicon dioxide stop layer is deposited over the alumina. The CMP is executed using the selected slurry to planarize the wafer down to the stop layer. Preferably only a negligible amount of the stop layer remains and the height of the metal structure is essentially the same as the deposited height of the refilled alumina.

18 Claims, 3 Drawing Sheets

METHOD FOR FABRICATING THIN FILM MAGNETIC HEADS USING CMP WITH POLISHING STOP LAYER

FIELD OF THE INVENTION

The invention relates to the field of thin film device fabrication and more particularly to methods, materials and structures used to fabricate magnetic transducers used in data storage devices; and even more particularly, the invention relates methods, materials and structures used in combination with CMP processes during the fabrication of magnetic heads.

BACKGROUND OF THE INVENTION

The read and write head portions of the slider for use in a typical prior art magnetic disk recording system are built-up in layers using thin film processing techniques. In the typical process of fabricating thin film magnetic transducers, a large number of transducers are formed simultaneously on a wafer. After the basic structures are formed the wafer is cut into rows or individual transducers. The magnetic sensor can be any one of various types including tunnel-junction (TMR) and spin valves (GMR). The magnetic transducer 20 is composed of elements that perform the task of writing magnetic transitions (the write head 21) and reading the magnetic transitions (the read head 22) as illustrated in FIG. 1A. The components of the read head 22 are the first shield (S1), the sensor element 25 and the second shield (S2). Separation layer 26 separates S2 from P1 and contributes to the spacing between the read head 22 and the write head 21. The yoke in magnetic transducer 20 includes three pole pieces P1 34, P2 32 and P3 43. P1 has a pedestal pole piece P1P 34P. The P2 32 confronts the P1P 34P across the write gap layer 42 to form the write gap at the ABS. Typically write heads only have one coil layer 37, but two or more coil layers 37, 39 are possible. The P3 43 arches over the resist mound 47. FIG. 1B is an illustration of an enlarged cross section of a prior art magnetic transducer as viewed from the air-bearing surface showing the P2 tip 32T and P1P tip 34T which confront each other across the gap layer 42.

At various stages during the fabrication process chemical-mechanical polishing (CMP) is used to planarize the wafer, achieve desired thicknesses of features. For example, CMP is used to planarize the surfaces of S1, P1, P1P, and P2. Features are typically formed on the wafer by plating through photolithography masks and followed by deposition of refill material over the wafer. CMP is used to planarize the wafer after the refill deposition. The active components in magnetic heads are typically metals such as copper, NiFe, CoFe and CoNiFe. The refill material is typically alumina. The slurry used for CMP conventionally includes an abrasive such as silica or alumina, surfactants, corrosion inhibitors and etchants. Conventionally in preparation for planarization the material for a head component such as shield and pole pieces are deposited significantly thicker than the final target value. Similarly the refill material is also deposited significantly above the final. When the CMP is executed the excess material is removed.

In U.S. Pat. No. 6,554,878 to Dill, et al. a slurry is described for chemically mechanically polishing copper, alumina and nickel iron to a common plane. The slurry includes colloidal silica, potassium and/or sodium persulfate and ammonium persulfate (APS). The concentrations are tailored to chemically-mechanically polish alumina and nickel iron at the same rate or to chemically-mechanically polish the copper at the same rate as the other materials to the same plane.

In U.S. patent application Ser. No. 20020012195 to Lahiri, et al., a P2 pole tip/yoke interface structure in a magnetic head is formed by a process which includes two CMP polishing steps performed on the surface of the write head wafer subsequent to the plating of the P2 pole tip. A refill layer of a dielectric material, such as alumina, is deposited on the wafer surface over the P2 pole tips. The alumina layer projects up wherever the P2 pole tips are formed on the wafer. A first chemical mechanical polishing (CMP) step is next conducted upon the wafer. The first CMP step utilizes a relatively hard polishing pad and a chemical polishing slurry that removes alumina and NiFe at approximately equal rates. The slurry may have a neutral pH with a passivating agent such as benzothiazole (BTA), to a higher pH of approximately 10 where a passivating agent normally is not required. A chemical oxidant may be included in the slurry, and a preferred oxidant is ammonium persulfate. The relatively hard pad preferentially removes the projecting portions and the slurry attacks and removes the alumina and the NiFe that constitutes the P2 pole tip. The first CMP step is conducted until the top surface of each P2 pole tips formed on the wafer is exposed within the polished surface of the alumina layer, as is depicted in The second CMP step of the present invention involves the utilization of a relatively soft polishing pad along with an acidic polishing slurry. An oxidant, such as ammonium persulfate is preferably included in the acidic polishing slurry. The acidic polishing slurry coupled with the soft polishing pad of the second CMP step create an environment in which the P2 pole tip is preferentially attacked as compared to the alumina. As a result, the second CMP step acts to remove the upper surface of the pole tip to form a recessed P2 pole tip surface.

Various nitrides have been proposed as CMP stop layers. In U.S. patent application Ser. No. 2002/0065023 by Siang Ping Kwok suggests using a three layer film, such as nitride/oxide/nitride for a CMP stop layer on the IC chips. In U.S. patent application Ser. No. 20010049183 by Henson, et al., SiC is used as a CMP stop layer.

What is needed is an improved slurry and stop layer for use in fabricating the structures in magnetic heads.

SUMMARY OF THE INVENTION

A method is described for thin film processing using a selected CMP slurry with a silicon dioxide stop layer. The slurry includes an abrasive (preferably alumina), a corrosion inhibitor (preferably 1H-benzotriazole (BTA)), and an oxidizer (preferably hydrogen peroxide). The method is particularly useful for fabricating thin film heads where alumina is used as the dielectric. The method can be used to planarize metal structures surrounded by alumina which are typical in magnetic heads. The metals which can be used include NiFe, CoFe, CoNiFe and copper. A preferred method according to the invention deposits the metal for the selected structure slightly higher than the final target height. The shape of the structure is defined using standard photolithography. The alumina refill is deposited to the final target height, slightly below the height of the metal. A thin silicon dioxide stop layer is deposited over the alumina. The CMP is executed using the selected slurry to planarize the wafer down to the stop layer. Preferably only a negligible amount of the stop layer remains and the height of the metal structure is essentially the same as the deposited height of the refilled alumina. Since deposited film thickness and uniformity are well controlled, the result is a metallic structure with a height and uniformity more precisely controlled than is achievable using prior art CMP techniques.

DETAILED DESCRIPTION OF THE INVENTION AND THE PREFERRED EMBODIMENTS

Figure 1A:
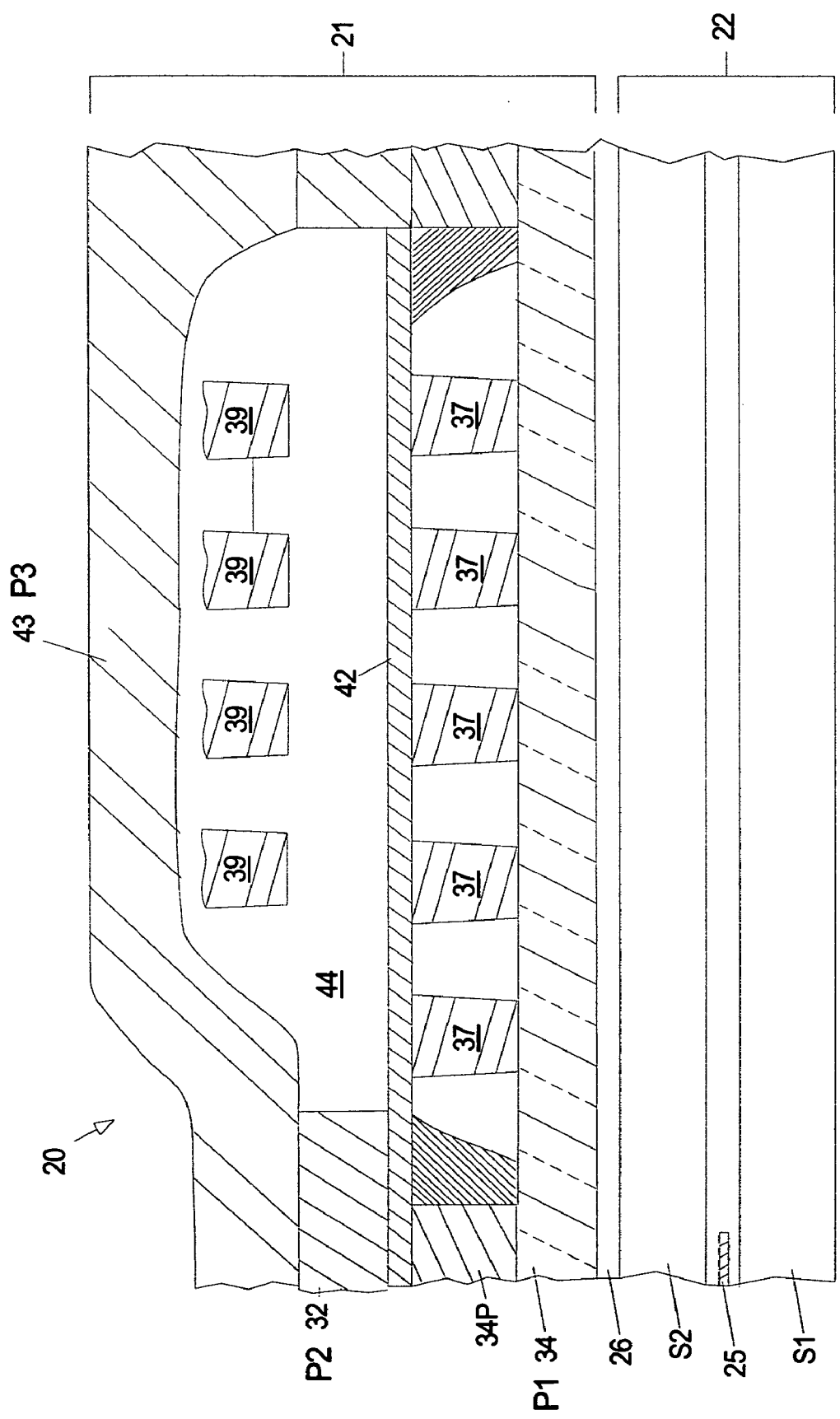
FIG. 1A is an illustration of a cross section of one type of prior art magnetic transducer.
Figure 1B:
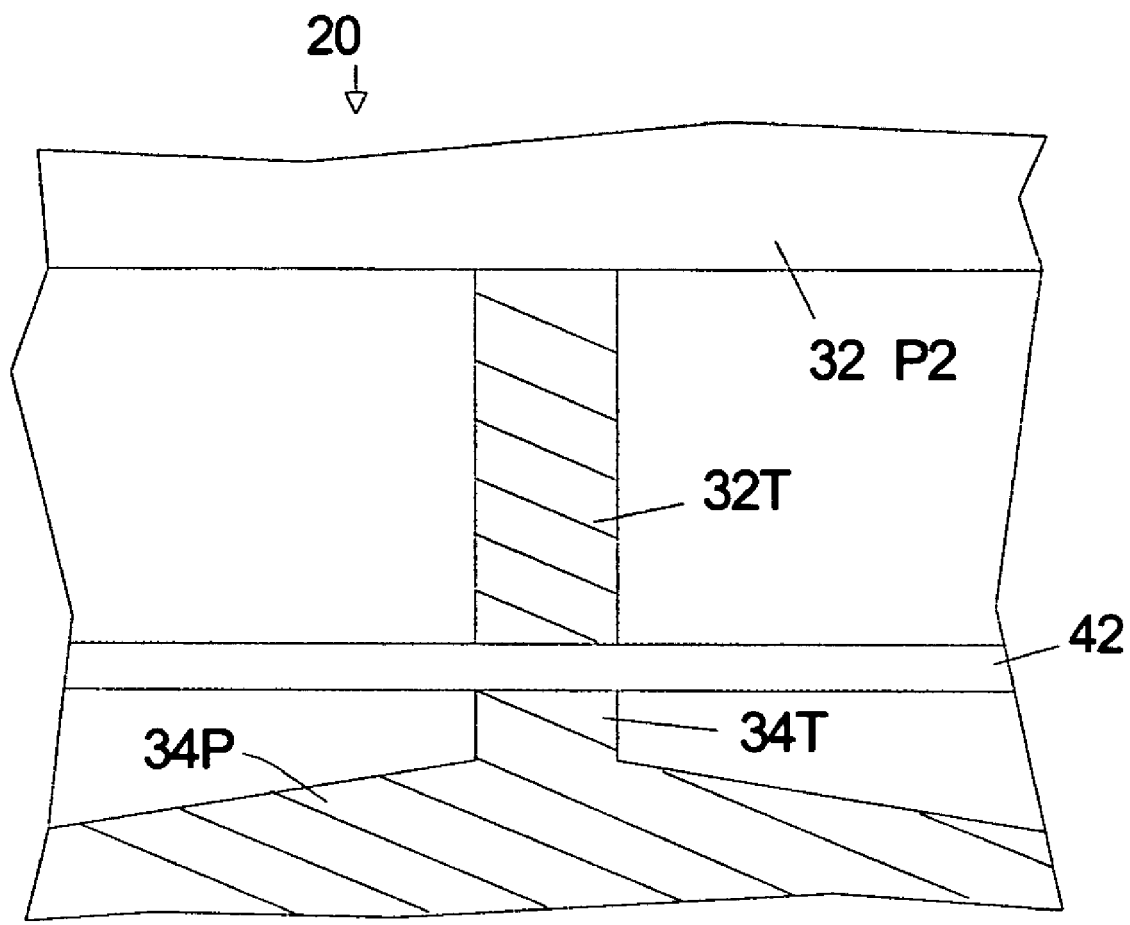
FIG. 1B is an illustration of an enlarged cross section of the prior art magnetic transducer of FIG. 1A as viewed from the air-bearing surface showing the P2 tip 32T and P1P tip 34T
Figure 2:
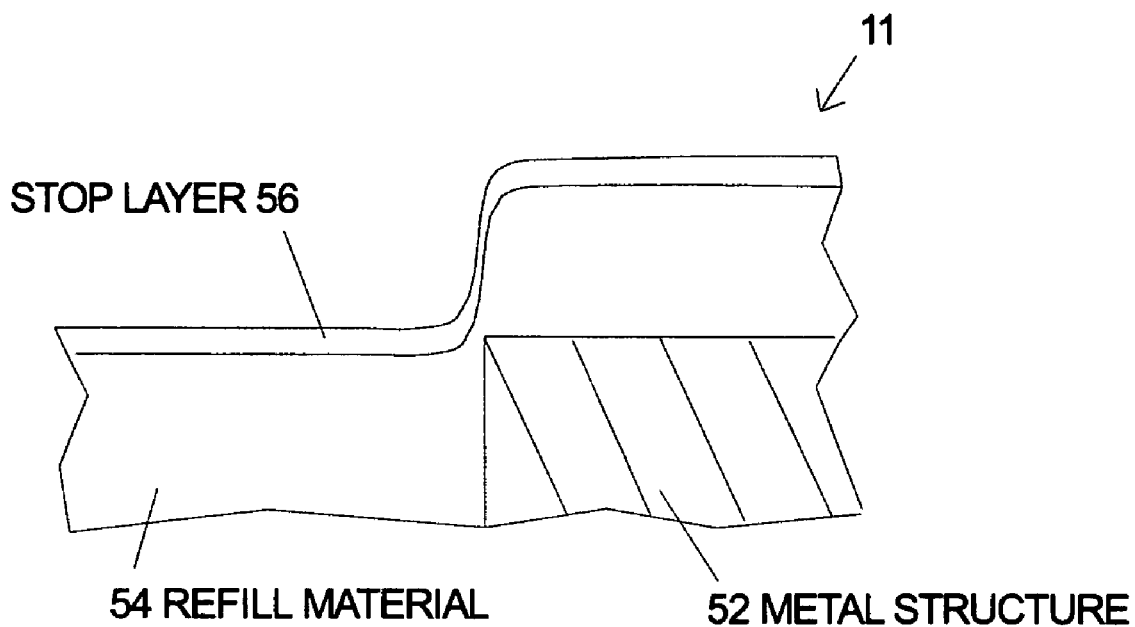
FIG. 2 is an illustration of a section of a wafer on which magnetic heads are being manufactured according to the invention. The section is taken perpendicular to the surface of the wafer and the plane of the thin films.

FIG. 2 is an illustration of a section of a wafer 11 on which thin film magnetic heads are being fabricated according to the invention. The section is taken perpendicular to the surface of the wafer and the plane of the thin films. Typically a large number of heads or other devices are fabricated simultaneously on a wafer. The discussion below illustrates the method of the invention for a single head, but any number of heads can be fabricated simultaneously with the invention. The method of the invention can be used at various stages of the fabrication process for magnetic heads including shield and pole piece formation. The description below will illustrate the invention by describing an embodiment with reference to a P1P fabrication process. The invention can also used in S1, P1, and P2 phases of the magnetic head fabrication process.

In FIG. 2 the metal structure 52, which can be a shield, pole piece, pole piece pedestal or other similar component, has been patterned according to the prior art. The deposited thickness of the metal, however, is less than in the prior art due to the advantages provided by the invention. Conventionally, the planarization process for this structure requires that the metal be deposited significantly thicker than the final target value. In prior art processing, for example, the NiFe for S1, P1, P1P or P2 can be 1 micron thicker than the final target value and the alumina might be deposited 0.8 microns higher than NiFe. The invention allows the metal for the structure to be plated deposited to approximately the target thickness. The reduced deposition thickness for the metal and the alumina can result in a significantly lower plating deposition time. A preferred method according to the invention deposits the metal 52 for the selected structure only slightly higher than the final target height. The alumina refill 54 is deposited to the final target height, which is slightly below the height of the metal. A thin (for example, 50 nm) silicon dioxide (SiO$_2$) stop layer 56 is deposited over the alumina. Preferably the optimum thickness of the stop layer 56 in a particular manufacturing process is determined empirically, but a range from 0.05 to 0.2 microns is reasonable. Preferably only a negligible amount of the stop layer will remain after the CMP and the height of the finished metal structure will be essentially the same as the deposited height of the refilled alumina. Since deposited film thickness and uniformity are well controlled, the result is a metallic structure with a height more precisely controlled than is achievable using prior art CMP techniques to thin deposited layers to a target thickness.

The selected slurry according to the invention includes an abrasive (preferably alumina), a corrosion inhibitor (preferably 1H-benzotriazole (BTA)), and an oxidizer (preferably hydrogen peroxide). The parameters for the alumina abrasive are not critical to the function of the slurry and any size or shape of particle usable in thin film processing can be used with the invention. Preferably the hydrogen peroxide content is from 0.1-10% by volume with BTA providing the bulk of the slurry. Optionally a biocide such as isothiazolone can be included. Metals which are typically used in magnetic heads can be used with this slurry and include NiFe, CoFe, CoNiFe and copper. The alumina abrasive used in these experiments was 130 nm. The slurry pH was 4.

The selected slurry has a high selectivity for alumina over silicon dioxide. The removal rate of protruding alumina using the slurry according to the invention is many times faster than the removal rate of planar silicon dioxide which creates a relatively wide processing window in which the CMP can be executed in a large scale manufacturing process. The execution of the CMP on the surface shown in FIG. 2 preferentially attacks the protruding material above the metal structure 52 resulting in removal of both the silicon dioxide and the alumina. The planar area of the silicon dioxide away from the metal structure is resistant to the CMP and is only slowly removed. Therefore, the protruding material is removed by the CMP at a faster rate. The thickness of the silicon dioxide stop layer for a given CMP process can be determined empirically so that only negligible silicon dioxide is left after the CMP has removed the protruding alumina. The time and other parameters of the CMP process can be adjusted to optimize the result.

The rates of removal of the planar silicon dioxide and the protruding alumina will vary significantly during the CMP process. Initially the entire surface is covered with silicon dioxide, but the protruding silicon dioxide material over the alumina will be relatively quickly removed due to the inherent weakness of protruding material. The removal of the silicon dioxide is dominated by abrasive action. Once the protruding silicon dioxide is removed exposing the alumina underneath, the selectivity of the slurry becomes significant. The removal rate of the protruding alumina will be significantly higher than the removal rate of the planar silicon dioxide. Once the wafer is planarized the removal is stopped due to extremely low removal rate of silicon dioxide from this slurry.

In an experiment using the slurry of the invention the applicants obtained a hundred to one (100:1) differential in the rate of removal of alumina versus planar silicon dioxide. In comparison, a prior art slurry of silicon dioxide, BTA and ammonium persulfate (APS) removes protruding alumina and planar silicon dioxide at ratio of one to one (1:1). In the specific experiment applicants used 3 psi of downward polishing pressure. The protruding alumina was removed at a rate of 5 nm/second and the planar silicon dioxide was removed at only 0.05 nm/second. After planarization was achieved the removal rate of both materials was 0.25 nm/second.

Figure 3:
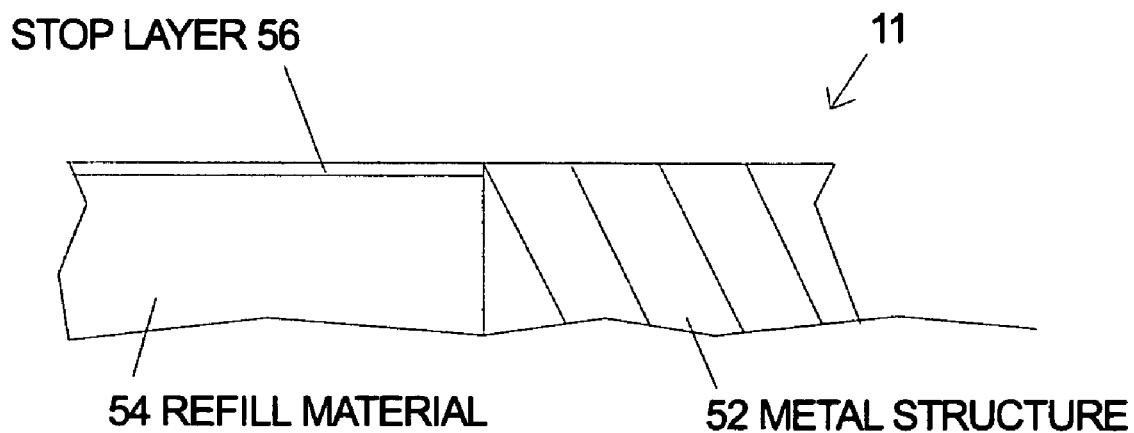
FIG. 3 is an illustration of a section of the wafer of FIG. 2 after a CMP according to the invention has been completed on the wafer.

FIG. 3 illustrates the wafer state after a CMP according to the invention has been completed on the wafer of FIG. 2. The CMP is executed using the selected slurry to remove the protruding material above the NiFe 52 exposing the surface of the NiFe. The parameters including the duration of the CMP are determined empirically to preferably result in most of the stop layer 56 over the non-protruding areas of the head being removed leaving only a small, typically negligible amount. Since the silicon dioxide is dielectric like alumina some of the silicon dioxide can remain on the alumina without affecting the performance of the structure for the typical magnetic head. All of the silicon dioxide can be removed if desired. If the CMP is continued longer than necessary some recession of the NiFe in relation to the alumina will occur, but the rate of recession is low. This fact contributes to high yield when the invention is used for large scale manufacturing, since some over polishing can occur without significant damage.

Tests of the slurry, silicon dioxide stop layer and method of the invention have shown high accuracy of final thicknesses of target structures across samples of magnetic heads. In table 1 the results of these tests are summarized.

The first two rows in Table 1 are for NiFe structures initially deposited by plating to 3200 nm thickness where the final target thickness was 3000 nm. After alumina refill deposition, the thickness is 3103 nm and 3116 nm. After the execution of a CMP process using the selected slurry the thickness of metal was 2984 nm and 2995 nm.

The third and fourth rows in Table 1 are for NiFe structures initially deposited by plating to 3200 nm thickness which was significantly thicker than the final target thickness of 2000 nm. After alumina refill deposition, the thickness is 2031 nm and 2028 nm. After the execution of a CMP process using the selected slurry the thickness of metal was 1962 nm and 1937 nm. The standard deviation (sigma) of the alumina layer thickness for a set of selected points on the four wafers processed according to the invention were all under 20 nm while the prior art process had a sigma of 90 nm. Therefore, the invention resulted in significantly improved control of the thickness and uniformity.

TABLE 1

Manufacturing Test Results

| Plating Thickness | Refill Thickness | Target Thickness of NiFe | Post CMP Thickness of NiFe | Wafer Sigma |
| --- | --- | --- | --- | --- |
| 3200 nm NiFe | 3103 alumina | 3000 nm | 2984 nm | 13 nm |
| 3200 nm NiFe | 3116 alumina | 3000 nm | 2995 nm | 19 nm |
| 3200 nm NiFe | 2031 alumina | 2000 nm | 1962 nm | 10 nm |
| 3200 nm NiFe PRIOR ART PROCESSING | 2028 alumina | 2000 nm | 1937 nm | 12 nm |
| 3700 nm NiFe | 4500 alumina | | 2700 nm | 90 nm |

Since the invention preferably removes none or very little of the refill material under the silicon dioxide stop layer, the final height is essentially the original height of the deposition of the refill material. Therefore, the precision of the thickness and uniformity of the deposition of the refill material determines the final height and uniformity for the pole tip or other structure. This is an advantage of the invention since the thin film deposition processes can deposit films that are more precise than the films resulting from prior art CMP processing. The result is a greater precision in the thickness or height and uniformity of critical structures of the magnetic head than is achievable using prior art CMP.

Although the embodiments of the invention have been described in particular embodiments those skilled in the art will recognize that the invention may be used in other embodiments where similar conditions exist.

The invention claimed is:

1. A method fabricating thin film magnetic heads on a wafer comprising the steps of:
   depositing alumina over a wafer with a plurality of thin film metallic structures for magnetic heads fabricated thereon, the thin film metallic structures protruding from the surface of the wafer and having a first thickness, the alumina being deposited to a second thickness which is less than the first thickness;
   depositing a layer of silicon dioxide over the alumina; and
   performing a CMP on the wafer using a slurry including an alumina abrasive and an oxidizer, the CMP continuing until the silicon dioxide and the alumina over the thin film metallic structures have been removed and the metallic structures are reduced to approximately the second thickness.

2. The method of claim 1 wherein the CMP continues until the layer of silicon dioxide has been reduced to a negligible or zero thickness in areas adjacent to the thin film metallic structures.

3. The method of claim 1 wherein the oxidizer is hydrogen peroxide.

4. The method of claim 3 wherein the slurry contains between 0.1% and 10% hydrogen peroxide by volume.

5. The method of claim 1 wherein the slurry includes 1 H-benzotriazole (BTA) as a corrosion inhibitor.

6. The method of claim 1 wherein the thin film metallic structures are made from NiFe, CoFe, CoNiFe or copper.

7. The method of claim 1 wherein the thin film metallic structures are a shield, a pole piece or a pole piece pedestal.

8. A method of fabricating thin film magnetic heads on a wafer comprising the steps of:
   depositing a metal layer for a magnetic head to a first thickness on the wafer;
   patterning a selected component for a plurality of thin film magnetic heads in the metal layer by removing metal around the component, the selected component protruding above an adjacent surface of the wafer;
   depositing alumina over the wafer to a second thickness which is less than the first thickness;
   depositing silicon dioxide over the alumina to a third thickness; and
   executing a CMP on the wafer using a slurry containing an alumina abrasive and an oxidizer to remove the silicon dioxide and the alumina over the selected component and planarize the wafer to a top level of the alumina around the component.

9. The method of claim 8 wherein the oxidizer is hydrogen peroxide.

10. The method of claim 9 wherein the slurry contains between 0.1% and 10% hydrogen peroxide by volume.

11. The method of claim 8 wherein the slurry includes 1H-benzotriazole (BTA) as a corrosion inhibitor.

12. The method of claim 8 wherein the metal layer is NiFe, CoFe, CoNiFe or copper.

13. A method of fabricating thin film magnetic heads on a wafer comprising the steps of:
   depositing a metal layer to a first thickness on the wafer;
   patterning a selected component for a plurality of thin film magnetic heads in the metal layer by removing the metal layer around the selected component;
   depositing alumina over the wafer to a second thickness which is less than the first thickness, the second thickness being a selected target thickness for the selected component;
   depositing a stop layer of silicon dioxide over the alumina to a third thickness; and executing a CMP on the wafer using a slurry containing an alumina abrasive and an oxidizer to remove the silicon dioxide and the alumina over the selected component and planarize the wafer to a top level of the alumina adjacent to the selected component around the component by removing essentially all of the silicon dioxide of the stop layer adjacent to the selected component and thereby forming the selected component at approximately the selected target thickness.

14. The method of claim 13 wherein the oxidizer is hydrogen peroxide.

15. The method of claim 14 wherein the slurry contains between 0.1% and 10% hydrogen peroxide by volume.

16. The method of claim 13 wherein the slurry includes 1 H-benzotriazole (BTA) as a corrosion inhibitor.

17. The method of claim 13 wherein the metal layer is NiFe, CoFe, CoNiFe or copper.

18. The method of claim 13 wherein the selected component is a first shield (Si), a pole piece or a pole piece pedestal.

* * * * *